United States Patent
Gallo et al.

(10) Patent No.: US 9,153,027 B2
(45) Date of Patent: Oct. 6, 2015

(54) SYSTEM, METHOD, AND COMPUTER PROGRAM PRODUCT FOR PERFORMING FAST, NON-RIGID REGISTRATION FOR HIGH DYNAMIC RANGE IMAGE STACKS

(71) Applicant: NVIDIA Corporation, Santa Clara, CA (US)

(72) Inventors: Orazio Gallo, Santa Cruz, CA (US); Kari Antero Pulli, Palo Alto, CA (US); Jun Hu, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 60 days.

(21) Appl. No.: 14/070,399

(22) Filed: Nov. 1, 2013

(65) Prior Publication Data

US 2015/0125091 A1    May 7, 2015

(51) Int. Cl.
*G06K 9/40* (2006.01)
*G06T 7/00* (2006.01)
*G06T 3/00* (2006.01)

(52) U.S. Cl.
CPC ............... *G06T 7/003* (2013.01); *G06T 3/0068* (2013.01); *G06T 7/0038* (2013.01); *G06T 2207/10016* (2013.01); *G06T 2207/20208* (2013.01); *G06T 2207/20221* (2013.01)

(58) Field of Classification Search
CPC .......... H04N 7/26771; H04N 7/26888; H04N 1/195; H04N 3/08; H04N 5/2259; H04N 5/2628; H04N 1/3876; G02B 26/106; G06K 9/00; G06T 3/4038; G06T 5/001; G06T 3/0093; G06T 7/003; G06T 7/0038
See application file for complete search history.

(56) References Cited

U.S. PATENT DOCUMENTS

| | | | | |
|---|---|---|---|---|
| 5,686,960 | A | * | 11/1997 | Sussman et al. ........... 348/218.1 |
| 6,148,120 | A | * | 11/2000 | Sussman ....................... 382/293 |
| 2009/0028403 | A1 | * | 1/2009 | Bar-Aviv et al. ............. 382/128 |
| 2013/0127844 | A1 | * | 5/2013 | Koeppel et al. ............... 345/419 |
| 2014/0140635 | A1 | * | 5/2014 | Wu et al. ....................... 382/266 |
| 2014/0347469 | A1 | * | 11/2014 | Zhang et al. .................. 348/118 |

OTHER PUBLICATIONS

Hu, J. et al., "HDR Deghosting: How to deal with Saturation?" Proceedings of the IEEE Conference on Computer Vision and Pattern Recognition, Jun. 2013, pp. 1-8.
Sen, P. et al., "Robust Patch-Based HDR Reconstruction of Dynamic Scenes," ACM Transactions on Graphics, Proceedings of ACM SIGGRAPH Asia 2012, vol. 31, No. 6, Nov. 2012, pp. 1-11.
Hu, J. et al., "Exposure Stacks of Live Scenes with Hand-held Cameras," Proceedings of the European Conference of Computer Vision, Oct. 2012, pp. 1-14.

* cited by examiner

*Primary Examiner* — Amir Alavi
(74) *Attorney, Agent, or Firm* — Zilka-Kotab, PC

(57) ABSTRACT

A system, method, and computer program product are provided for performing fast, non-rigid registration for at least two images of a high-dynamic range image stack. The method includes the steps of generating a warped image based on a set of corresponding pixels, analyzing the warped image to detect unreliable pixels in the warped image, and generating a corrected pixel value for each unreliable pixel in the warped image. The set of corresponding pixels includes a plurality of pixels in a source image, each pixel in the plurality of pixels associated with a potential feature in the source image and paired with a corresponding pixel in a reference image that substantially matches the pixel in the source image.

17 Claims, 12 Drawing Sheets
(6 of 12 Drawing Sheet(s) Filed in Color)

20 # SYSTEM, METHOD, AND COMPUTER PROGRAM PRODUCT FOR PERFORMING FAST, NON-RIGID REGISTRATION FOR HIGH DYNAMIC RANGE IMAGE STACKS

FIELD OF THE INVENTION

The present invention relates to image processing, and more particularly to techniques related to high dynamic range imaging.

BACKGROUND

Dynamic range in photography represents the ratio between light intensity captured in the brightest part of the image and the darkest part of the image. Film or an image sensor is exposed to light for a set time, known as the exposure time, and the film or image sensor reacts to the amount of light that strikes the surface of the film or image sensor during that time. Typically, the recording medium (i.e., film or pixel sites in the image sensor) has a limit to the range of intensities that can be recorded. For example, if the exposure time is short, the recording medium may not capture enough light in darker parts of the image to record details about the object in the scene. In other words, part of the image is underexposed. Similarly, if the exposure time is long, the recording medium may capture too much light in brighter parts of the image such that details about the object are washed out. In other words, part of the image is overexposed.

High-dynamic range imaging uses multiple images of nearly the same scene captured using different exposure settings to create an image that has a higher dynamic range than a single image captured using a single exposure setting with the recording medium. For example, a series of three or more images may be captured using a digital camera in short succession changing the exposure time and/or aperture size for each image. These images are then blended to increase the dynamic range of the composite image, enabling details to be shown in both darker areas and lighter areas of the same image.

Because the images in the high-dynamic range (HDR) image stack are captured at different times, objects in the image may have shifted. In other words, both the camera could have shifted (e.g., if the camera is hand-held) or objects could be moving within the frame. Blending the images without adjusting for this motion causes ghosting where objects that move appear translucent and are seen in two places at once. Existing techniques can be used to find a match for each pixel in a reference image to a corresponding pixel in a second image. However, conventional techniques are either robust but slow (i.e., the techniques can't be performed at interactive frame rates and may take minutes to register a single set of HDR images) or fast but inaccurate (i.e., the blending still leaves visible image artifacts that are disturbing to a viewer). Some applications require HDR registration and blending to be performed at interactive frame rates (such as when viewing HDR video in real-time) while not sacrificing the quality of the product. Thus, there is a need for addressing these issues and/or other issues associated with the prior art.

SUMMARY

A system, method, and computer program product are provided for performing fast, non-rigid registration for at least two images of a high-dynamic range image stack. The method includes the steps of generating a warped image based on a set of corresponding pixels, analyzing the warped image to detect unreliable pixels in the warped image, and generating a corrected pixel value for each unreliable pixel in the warped image. The set of corresponding pixels includes a plurality of pixels in a source image, each pixel in the plurality of pixels associated with a potential feature in the source image and paired with a corresponding pixel in a reference image that substantially matches the pixel in the source image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The disclosed algorithm warps a source image by propagating an estimated sparse flow field to a dense flow field and then correcting for errors in the dense flow field. Known warp vectors at certain pixels may be propagated to adjacent pixels in an edge-aware fashion such that objects bounded by edges are warped in a substantially uniform fashion. The technique results in a warped image with unreliable pixels that are then corrected by blending pixel values from the source image with pixel values from a reference image.

Figure 1:
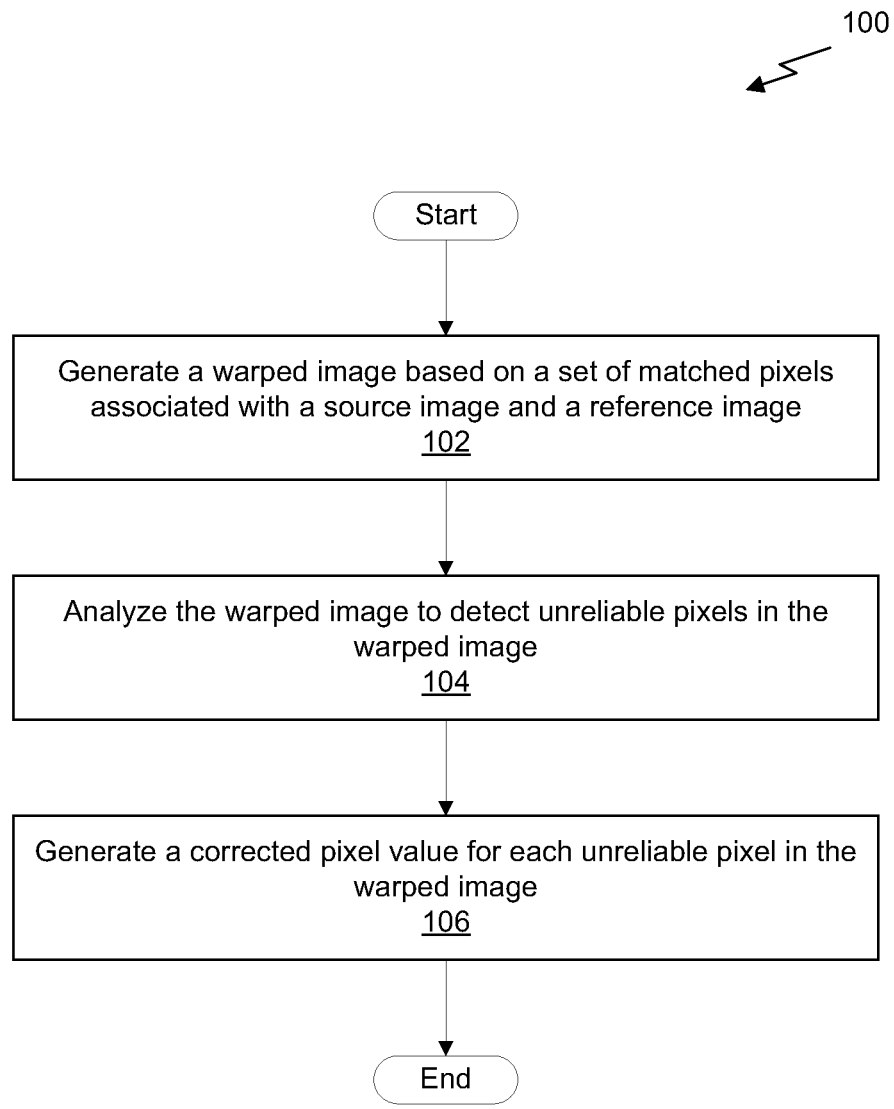
FIG. 1 illustrates a flow chart of a method for performing fast, non-rigid registration for HDR image stacks, in accordance with one embodiment.

FIG. 1 illustrates a flow chart of a method 100 for performing fast, non-rigid registration for HDR image stacks, in accordance with one embodiment. At step 102, a warped image is generated based on a set of corresponding pixels. In the context of the present disclosure, the set of corresponding pixels comprises a plurality of pixels in a source image, each pixel in the plurality of pixels associated with a potential feature in the source image and paired with a corresponding pixel in a reference image that substantially matches the pixel in the source image. Features may be referred to herein as edges and may be defined as pixels associated with peak gradients above a threshold value. In one embodiment, the warped image is generated by propagating an estimated sparse flow field fit to at least a portion of the pairs of corresponding pixels in the set of corresponding pixels to a dense flow field in an edge-aware manner. It will be appreciated that the warped image is intended to be a modified version of the source image that is geometrically consistent with the reference image except that the intensity of the pixels in the warped image reflect a difference in the exposure settings between the source image and the reference image.

At step 104, the warped image is analyzed to detect unreliable pixels in the warped image. In one embodiment, gradients associated with pixels in the warped image are compared to gradients associated with pixels in the reference image in order to detect whether pixels in the warped image are reliable or unreliable. Pixels identified as reliable are assumed to be accurately warped from the source image. Pixels identified as unreliable are assumed to be inaccurately warped from the source image. For example, pixels associated with objects undergoing non-rigid motion may be unreliable. In addition, portions of the image without any matched pixels within a bounded set of edges may be unreliable because propagating the dense flow is not continued across boundaries or edges. At step 106, a corrected pixel value is generated for each unreliable pixel in the warped image. In one embodiment, a patch match algorithm is implemented to match a pixel location in the reference image that corresponds to the unreliable pixel to a pixel location in the source image. The matching pixel in the source image is then blended with the pixel in the reference image to generate a corrected pixel value.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
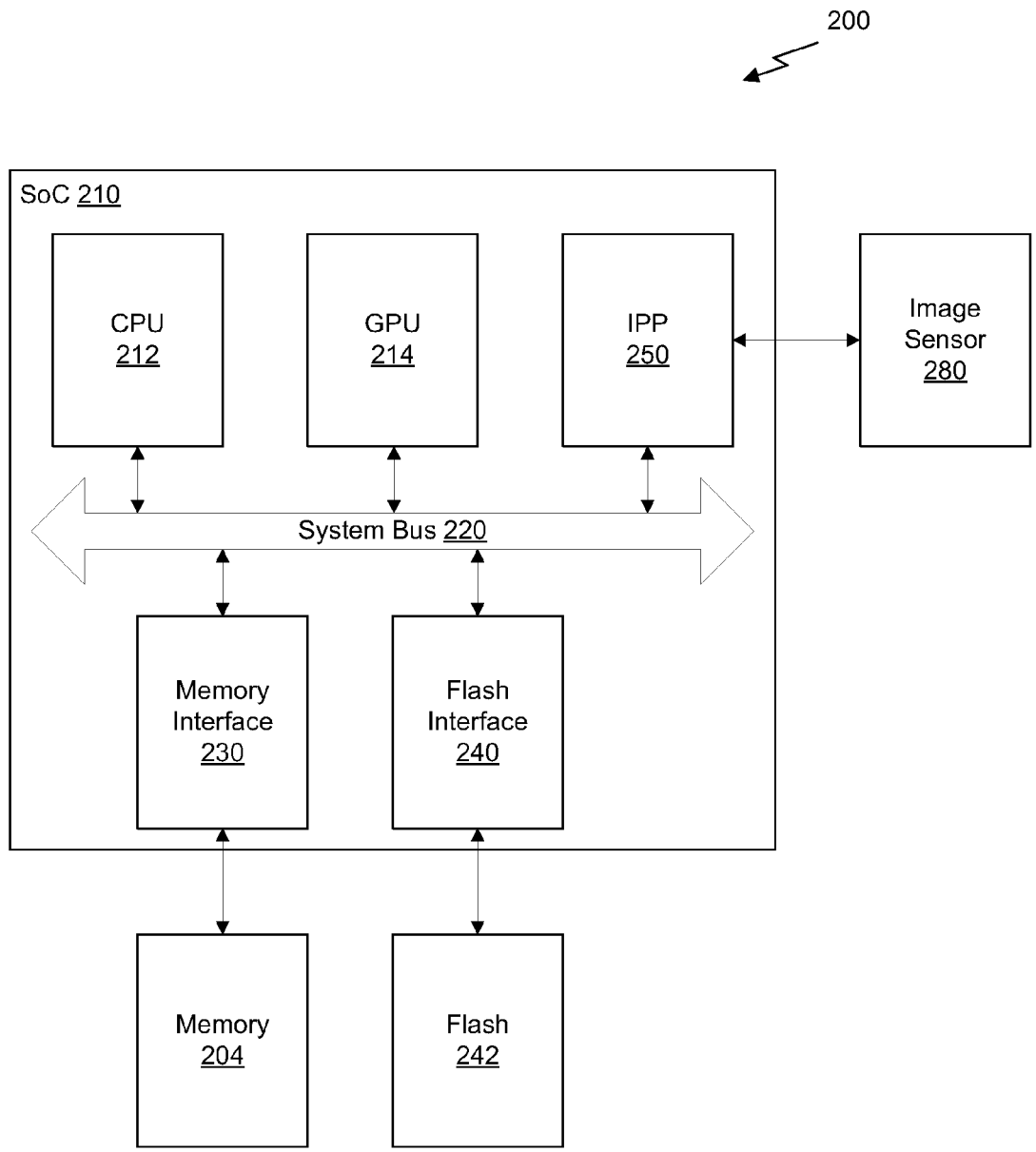
FIG. 2 illustrates a device configured to perform fast feature recognition in two-dimensional images, in accordance with one embodiment.

FIG. 2 illustrates a device 200 configured to perform fast feature recognition in two-dimensional images, in accordance with one embodiment. The device 200 may be, e.g., a desktop computer, a laptop computer, a tablet computer, a digital camera, a smart phone, a personal digital assistant (PDA), or the like. As shown in FIG. 2, the device 200 includes a system-on-chip (SoC) 210, a memory 204, a flash memory 242, and an image sensor 280. The memory 204 comprises one or more memory modules for temporary storage of volatile data. In one embodiment, the memory 204 comprises one or more dynamic random access memory (DRAM) modules. The flash memory 242 comprises a flash memory device that provides non-volatile, long term storage of data. In some embodiments, the flash memory 242 may be replaced by other types of non-volatile memory such as read-only memory (ROM), solid state drives (SSDs), optical disks (e.g., CD-ROM, DVD-ROM, etc.), secure digital (SD) cards, and the like. It will be appreciated that data, as used herein, refers to both program instructions and raw data processed by the instructions.

The SoC 210 includes a central processing unit (CPU) 212, a graphics processing unit (GPU) 214, a memory interface 230, a flash interface 240, an image processing pipeline 250, and a system bus 220. Each of the components of the SoC 210 may communicate with one or more of the other components via the system bus 220. The SoC 210 is implemented on a single silicon substrate and may be included in an integrated circuit package that provides an interface to a printed circuit board (PCB) that includes external interconnects to the other components of the device 200. In one embodiment, the CPU 212 is a reduced instruction set computer (RISC) such as an ARM® Cortex A9, 32-bit multi-core processor. The CPU 212 may have one or more cores and may be multi-threaded to execute two or more instruction per clock cycle in parallel. In other embodiments, the CPU 212 may be a MIPS based microprocessor or other type of RISC processor.

The CPU 212 retrieves data from the memory 204 via the memory interface 230. In one embodiment, the memory interface 230 includes a cache for temporary storage of data from the memory 204. The memory interface 230 implements a 32-bit DDR (double data rate) DRAM interface that connects to the memory 204. The CPU 212 may also retrieve data from the flash memory 242 to be written into the memory 204 via the flash interface 240 that, in one embodiment, implements an Open NAND Flash Interface (ONFI) specification, version 3.1. It will be appreciated that the flash interface 240 may be replaced by other types of interfaces for flash memory or other non-volatile memory devices, as required to interface with the particular type of non-volatile memory included in the device 200. For example, the flash interface 240 could be replaced by an IDE (Integrated Drive Electronics) interface (i.e., Parallel ATA) for connection to a solid state drive (SSD) in lieu of the flash memory 242.

In one embodiment, the SoC 210 includes a GPU 214 for processing graphics data for display on a display device, such as a liquid crystal display (LCD) device, not explicitly shown in FIG. 2. The GPU 214 implemented in the SoC 210 may be a low-power version of a discrete GPU. The GPU 214 includes a plurality of streaming processors configured to efficiently process highly parallel tasks, such as pixel processing. The GPU 214 may be configured to write processed pixel data to a frame buffer in the memory 204. A video interface, not explicitly shown in FIG. 2, may then be configured to read the pixel data from the frame buffer and generate video signals to transmit to the display device included in device 200 or connected to device 200 via an interface such as an HDMI (High-Definition Multimedia Interface) connector.

In some embodiments, the device 200 also includes an image sensor 280 for capturing digital images. The SoC 210 may transmit signals to the image sensor 280 that cause the image sensor 280 to sample pixel sites on the image sensor 280 that indicate a level of a particular wavelength or wavelengths of light focused on the pixel site. The level may be expressed as a level of luminosity of a red, a green, or a blue channel, and the level is transmitted to the SoC 210 as raw image sensor data. In one embodiment, the image sensor 280 is a CMOS (Complementary Metal Oxide Semiconductor) image sensor. In another embodiment, the image sensor 280 is a CCD (Charge Coupled Device) image sensor. It will be appreciated that the image sensor 280 may be included in an image sensor assembly that includes, in addition to the image sensor 280, one or more of a lens, a shutter mechanism, a filter, and the like. Some image sensor assemblies may include more than one lens, or the ability for a user to attach various lenses to the image sensor assembly that focus light on the surface of the image sensor 280.

In one embodiment, raw image sensor data may be transmitted to the image processing pipeline (IPP) 250 for processing. The SoC 210 may include IPP 250 as a discrete hardware unit within the single silicon substrate. In another embodiment, the SoC 210 may implement the functions of the IPP 250 via instructions executed by the CPU 212, the GPU 214, or a combination of the CPU 212 and the GPU 214. The IPP 250 will be described in more detail below in conjunction with FIG. 3.

Figure 3:
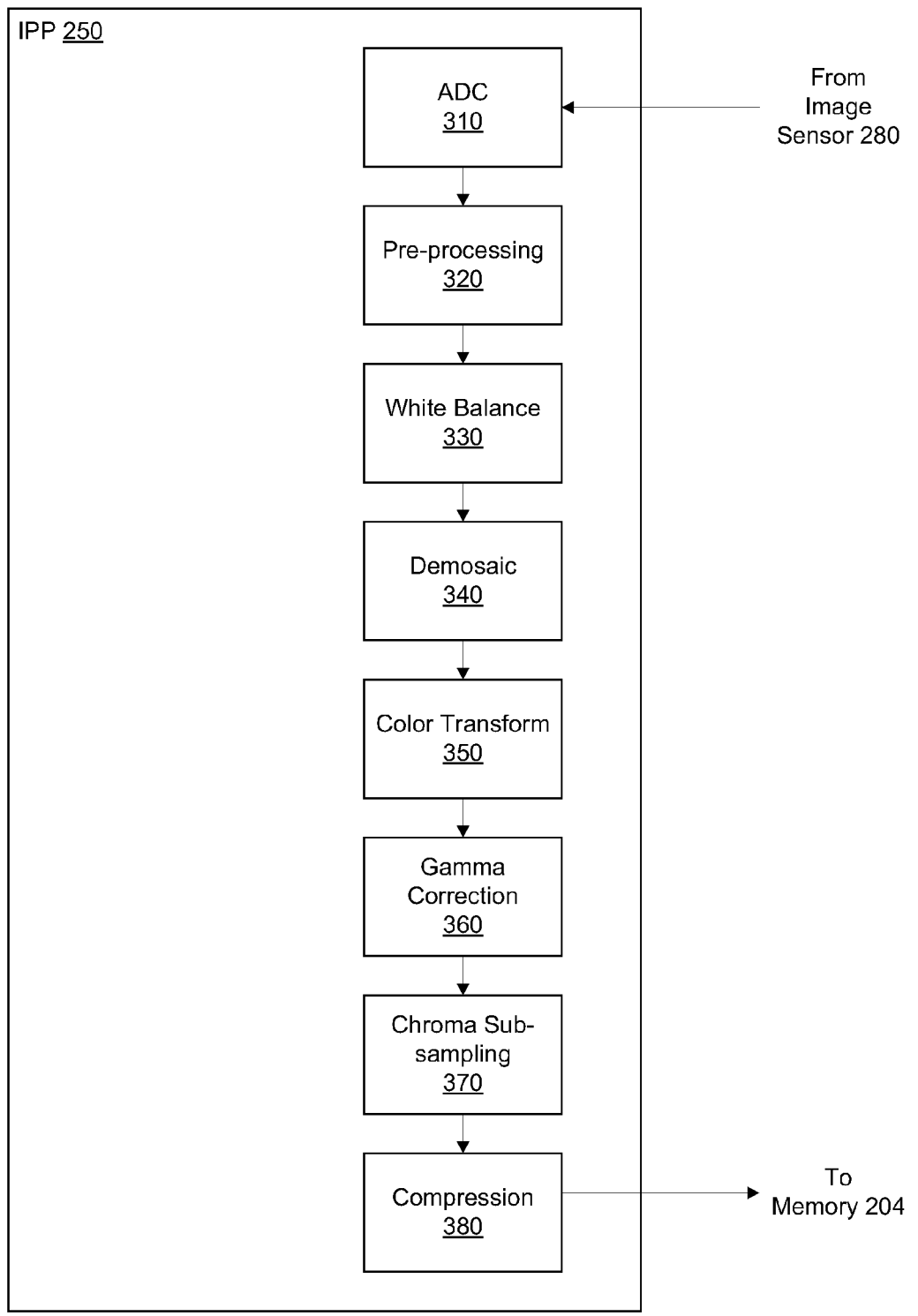
FIG. 3 illustrates the image processing pipeline of FIG. 2, in accordance with one embodiment.

FIG. 3 illustrates the image processing pipeline 250 of FIG. 2, in accordance with one embodiment. As shown in FIG. 3, the IPP 250 includes an analog-to-digital converter (ADC) 310, a pre-processing engine 320, a white balance engine 330, a demosaicing engine 340, a color transformation engine 350, a gamma correction engine 360, a chroma subsampling engine 370, and a compression engine 380. It will be appreciated that the IPP 250 is shown for illustration purposes and that the particular stages of the IPP 250 implemented by various manufacturers may be different. In other words, the IPP 250 may include additional stages in addition to or in lieu of the stages shown in FIG. 3.

In one embodiment, the ADC 310 receives the raw image sensor data and, for each pixel site, converts an analog signal into a digital value (i.e., an intensity value). In one embodiment, the ADC 310 has a resolution of eight or more bits and converts the analog signal for each pixel site into an 8-bit intensity value between 0 and 255. In another embodiment, the ADC 310 is built into the image sensor assembly and digital values are transmitted to the IPP 250 via a serial interface.

In one embodiment, the pre-processing engine 320 implements various processing algorithms based on the raw image sensor data. In one embodiment, the pre-processing engine 320 implements a filter to reduce cross-talk between pixel sites. In another embodiment, the pre-processing engine 320 implements a noise reduction algorithm. In yet other embodiments, the pre-processing engine 320 implements an image cropping algorithm. In still yet other embodiments, the pre-processing engine 320 implements an image scaling algorithm. It will be appreciated that various manufacturers of the device 200 may implement one or more processing algorithms within the functionality of the pre-processing engine 320.

The white balance engine 330 is configured to adjust the intensity values for each color channel in the processed image data to account for a color temperature of a light source. For example, fluorescent lighting and natural sunlight cause the same colored object to appear different in a digital image. The white balance engine 330 can adjust the intensity values for each pixel to account for differences in the light source.

The demosaicing engine 340 blends intensity values from different pixel sites of the image sensor 280 to generate pixel values associated with multiple color channels in a digital image. Most conventional image sensors include a color filter array such that each pixel site of the image sensor is associated with a single color channel. For example, a Bayer Filter Mosaic color filter includes two green filters, one red filter, and one blue filter for every 2×2 array of pixel sites on the image sensor. Each pixel site of the raw image sensor data is associated with only one color (e.g., red, green, or blue). The demosaicing engine 340 applies a special kernel filter to sample a plurality of pixel sites in the raw image sensor data to generate each composite pixel in the digital image, where each composite pixel is associated with three or more color channels (e.g., RGB, CMYK, etc.). The demosaicing engine 340 decreases the spatial resolution of the digital image in order to generate pixels of blended colors.

The color transformation engine 350 transforms the digital image generated by the demosaicing engine 340 from a non-linear, device dependent color space to a linear, device-independent color space. For example, the RGB color space is a non-linear, device dependent color space. The function of the color transformation engine 350 is to map the intensity of colors in the non-linear, device-dependent color space associated with the image sensor 280 to a standard, linear color space such as sRGB. The color transformation engine 350 transforms each pixel value (i.e., a vector of multiple color channels) by application of a 3×3 color transformation matrix to generate a transformed pixel value.

The gamma correction engine 360 adjusts the intensity values of the pixels of the digital image such that the digital image, when displayed on a display device with a non-linear response, properly reproduces the true colors of the captured scene. The chroma subsampling engine 370 divides the three chrominance channels (e.g., red, green, and blue) of the transformed pixels into a single luminance channel and two color difference channels. Because human vision responds more to luminance differences than chrominance differences, the two color difference channels can be stored using less bandwidth than the luminance channel without reducing the overall quality of the digital image. The compression engine 380 receives the uncompressed digital image from the chroma subsampling engine 370 and generates a compressed digital image for storage in a memory 204. In one embodiment, the compression engine 380 compresses the image using a JPEG (Joint Pictures Expert Group) codec to generate a JPEG encoded digital image file.

It will be appreciated that the number and order of the various components of the IPP 250, set forth above, may be different in various embodiments implemented by different manufacturers of the device 200. For example, in some embodiments, digital images may be stored in a RAW image format and the demosaicing engine 340 is not included in the IPP 250. In other embodiments, the chroma subsampling engine 370 and the compression engine 380 are not included in the IPP 250 because the digital image is stored in an uncompressed bitmap that describes pixels in the sRGB color space. It will be appreciated that different applications require different combinations and order of engines configured to implement various algorithms and that other processing engines, not described herein, may be added to or included in the IPP 250 in lieu of the processing engines described above.

Figure 4:
FIG. 4 illustrates two images in an HDR image stack, in accordance with one embodiment.
Figure 4:

FIG. 4 illustrates two images in an HDR image stack, in accordance with one embodiment. The HDR image stack includes a plurality of images including at least a reference image 410 and a source image 420. For example, the HDR image stack may include five images captured with different exposure settings, with the third captured image designated as the reference image 410. In order to register each of the other images to the reference image 410, one of the other images in the HDR image stack may be designated as the source image 420. Again, the reference image 410 may be captured with different exposure settings from the source image 420. For example, as shown in FIG. 4, the reference image 410 may be captured using a faster exposure time, as the scene appears darker than the source image 420. Furthermore, the scene captured in the HDR image stack includes both rigid and non-rigid motion. For example, the camera position may have moved slightly between the two images causing the background to shift. The shifting camera not only causes a translation of stationary objects in the scene, but parallax causes distant objects to move less relative to closer objects. The scene also captures non-rigid motion of certain objects, as illustrated in the images of FIG. 4 by noting that the subject's arms and ball are in different positions in the reference image 410 and the source image 420.

In order to create an HDR image from the reference image 410 and the source image 420, the two images are blended. A naïve method of fusing the images may be to simply blend each pixel in one image with a corresponding pixel in the other image at the same location relative to a particular corner of the images. However, with objects not located in the same positions in the two images, such blending would create ghosting that would be unpleasant to view. More specifically, the arms and ball of the subject would appear translucent in two different places due to the non-rigid motion of these objects. Thus, a more robust technique for blending images in the HDR image stack is needed to produce higher quality composite images. It will be appreciated that, once each image in the HDR image stack is registered to the reference image 410, the HDR image may be created by blending three or more images in the HDR image stack.

Figure 5A:
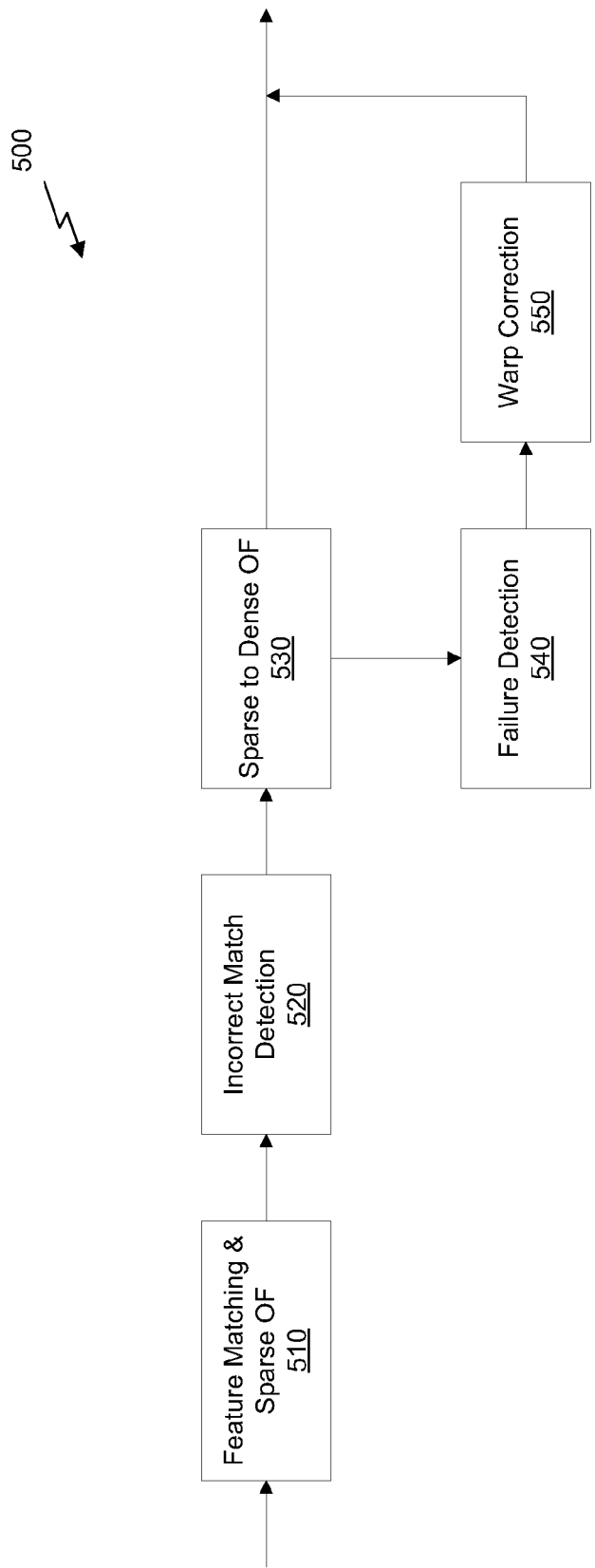
FIGS. 5A through 5F illustrate a conceptual diagram of a fast, non-rigid registration (FNRR) algorithm for HDR image stacks, in accordance with one embodiment.

FIGS. 5A through 5F illustrate a conceptual diagram of a fast, non-rigid registration (FNRR) algorithm 500 for HDR image stacks, in accordance with one embodiment. As shown in FIG. 5A, the FNRR algorithm 500 includes a number of steps implemented by various blocks (i.e., engines). As used herein, a block or engine is a set of logic, either software or hardware (or some combination thereof), that is configured to implement a portion of the FNRR algorithm 500. The FNRR algorithm 500 includes a feature matching & sparse optical flow (FMSOF) block 510, an incorrect match detection (IMD) block 520, a sparse to dense optical flow (SDOF) block 530, a failure detection (FD) block 540, and a warp correction (WC) block 550.

The FMSOF block 510 selects two images from the HDR image stack. A first image is designated as a reference image 410 and a second image is designated as a source image 420. The FMSOF block 510 identifies a number of pixels associated with features in the source image 420 and finds matching pixels in the reference image 410 corresponding with each of the identified pixels in the source image 420. The FMSOF block 510 may find the set of corresponding pixels by any technique well-known in the art. In one embodiment, the FMSOF block 510 may implement a sparse optical flow algorithm such as the Lucas-Kanade algorithm in order to match pixels in the source image 420 with pixels in the reference image 410. In other words, the FMSOF block 510 first identifies the pixels in the source image 420 that are associated with features. For example, the source image 420 may be divided into a plurality of blocks and each block of the source image 420 may be searched to discover a pixel in the block having a maximum gradient. As long as the maximum gradient is above a threshold value, then the pixel is identified as a feature pixel. It will be appreciated that any method may be implemented to identify feature pixels in the source image 420. Once a plurality of feature pixels have been identified in the source image 420, then each of the feature pixels are matched to a corresponding pixel in the reference image 410. The Lucas-Kanade algorithm provides one technique for finding a matching pixel in the reference image 410. First, a coarse estimate of a translation vector may be generated using low-resolution versions of the images. Then, the coarse estimate of the translation vector may be refined using an iterative process based on the gradients of the estimated matched pixel identified by the translation vector and an error between the identified pixel in the source image and the estimated matching pixel. The translation vector may be refined over a number of iterations.

Figure 5B:
Figure 5B:

As shown in FIG. 5B, the FMS OF block 510 identifies a plurality of feature pixels in the source image 420 that are matched to corresponding feature pixels in the reference image 410. The feature pixels and the matching feature pixels are circled in FIG. 5B. The output of the FMSOF block 510 is a set of corresponding pixels that include the feature pixels in the source image 420 and corresponding feature pixels in the reference image 410. It is well-known that the Lucas-Kanade technique is relatively accurate for well-textured images having small motion vectors. However, this technique may also introduce some mismatches or matches related to feature pixels that are moving non-rigidly.

The IMD block 520 is configured to eliminate incorrect matches or matches associated with non-rigid motion from the set of corresponding pixels. Again, the matching pixels identified by the FMSOF block 510 may be unreliable for use in estimating a dense optical flow. In order to propagate a sparse flow field fit to the set of corresponding pixels to generate a dense flow field for rigid motion, the set of corresponding pixels needs to be culled to remove outliers from the matching pixels. The matches may be incorrect matches (i.e., the pixels selected as a match are not related) or the matches are correct but the object associated with the pixels is moving in a non-rigid manner. In one embodiment, a RANSAC (RANdom SAmple Consensus) technique is used to identify reliable matches in the set of corresponding pixels. In other embodiments, other techniques may be used to separate the inliers from the outliers in the set of corresponding pixels.

In the RANSAC technique, the IMD block 520 selects a subset of the matched pixel pairs in the set of corresponding pixels. The subset of matched pixel pairs is used to generate an estimated homography matrix for registering the source image 420 to the reference image 410 using, e.g., a least squares technique. The estimated homography matrix is then applied to all of the matched pixels in the set of corresponding pixels to determine whether the estimated homography matrix is a good fit for each particular pair of matching pixels (i.e., determining whether an error between a warped pixel, generated by multiplying the pixel in the source image 420 by the estimated homography matrix, and a corresponding pixel in the reference image 410 is below a threshold value). If the error for a particular pair of matching pixels is small, then those pixels are considered a reliable match. However, if the error for a particular pair of matching pixels is large, then those pixels are considered an unreliable match. A score for the estimated homography matrix may be generated that is based on the number of reliable matches and/or unreliable matches identified in the set of corresponding pixels. The process is repeated a number of times for different subsets of matched pixel pairs using the same set of corresponding pixels. Then, the best estimated homography matrix is selected from all of the iterations and the reliable matches in the set of corresponding pixels associated with that particular estimated homography matrix may be removed from the set of corresponding pixels and stored as reliable matches.

Figure 5C:
Figure 5C:

In one embodiment, the RANSAC technique may be reapplied to the remaining set of corresponding pixels. It will be appreciated that, even though the first iteration of the RANSAC technique likely removed the largest set of matched pixel pairs fitting the estimated homography matrix, the matched pixel pairs remaining in the set of corresponding pixels may also include other correctly matched pairs that move rigidly and are, therefore, reliable matches for the purpose of propagating an estimated sparse flow field to a dense flow field. The RANSAC technique may be repeatedly applied to the remaining set of corresponding pixels until the number of matched pixel pairs in the set of corresponding pixels is below a threshold value. When the number of remaining matched pixel pairs is too low, then a subset of matched pixel pairs cannot robustly support the generation of an estimated homography matrix. The remaining matched pixel pairs in the set of corresponding pixels comprise unreliable matches and may be removed from the set of corresponding pixels. Each of the matched pixel pairs previously removed from the set of corresponding pixels and identified as reliable matches may then be added back to the set of corresponding pixels to generate a reliable set of corresponding pixels. As shown in FIG. 5C, the pixels associated with cyan circles are part of the reliable matches set and the pixels associated with magenta circles are part of the unreliable matches set which have been removed from the set of corresponding pixels.

Figure 5D:
Figure 5D:

Once the IMD block 520 has refined the set of corresponding pixels, the SDOF block 530 warps the source image 420 to generate a warped image 535 shown in FIG. 5D. The SDOF block 530 does not warp the source image 420 using an estimated homography matrix based on the set of corresponding pixels because such homography matrices would not correctly warp portions of the image having non-rigid motion and would not compensate for parallax. In one embodiment, the SDOF block 530 propagates the flow of pixels from the set of known matching pixels (i.e., a sparse optical flow) to each of the other pixels in the source image 420. The propagation of the optical flow from the matching pixels to other pixels may be performed in an edge-aware fashion. In other words, flow vectors for a particular pixel in the source image 420 may be interpolated based on nearby pixels included in the set of corresponding pixels so long as there are no edges between the particular pixel and any of the nearby pixels used for interpolation. For example, large surfaces such as a wall or whiteboard may be associated with pixels in the set of matching pixels located at the corners of the surfaces. A flow vector for each of the pixels inside the surface may then be estimated based on the flow vectors of pixels at the corners of the surface because all such pixels are inside the edges of the surface and move rigidly relative to said corners.

As shown in FIG. 5D, the resulting warped image 535 may be geometrically similar to the reference image 410 except the intensity of the pixels in the warped image may be different. In other words, similar objects in both the reference image 410 and the warped image 535 should appear in the same location, but the colors and/or intensity of those objects may be different based on the different exposure settings of the reference image 410 and the source image 420. It will be appreciated that there may be errors introduced when the source image 420 is warped. As shown in FIG. 5D, the upper right corner of the image has sections where edges prevented the optical flow to be propagated to these pixels. In addition, objects moving non-rigidly may be incorrectly warped and even objects that appear to be correctly warped, may be unreliable.

The FD block 540 is configured to determine which pixels in the warped image 535 are incorrect and which pixels in the warped image 535 are correct. In one embodiment, the FD block 540 may analyze the warped image 535 one scanline at a time. For each scanline, the FD block 540 calculates a gradient for each of the pixels in the scanline. It will be appreciated that, for most images, the gradient values along the scanline will have peaks at edges (i.e., abrupt changes in luminance and/or chrominance). These peaks may then be compared to a corresponding scanline in the reference image 410. These peaks should be aligned in both the reference image 410 and the warped image 535. Pixels in between aligned peaks may be considered reliable in the warped image 535. However, pixels in between misaligned peaks may be considered unreliable in the warped image 535. A peak may be misaligned if the peak in the scanline of the warped image 535 is more than a threshold number of pixels away from the corresponding peak in the scanline of the reference image 410. For example, if the peak is more than 2 pixels away from the correct pixel position in the warped image 535, then the peak is considered misaligned. It will be appreciated that gradient peaks may be calculated in only a single dimension (e.g., along the x-axis) that corresponds to the direction of the scanline. Pixels in the warped image between misaligned peaks are considered unreliable. While the technique is described above with respect to scanlines in the horizontal dimension, the technique may be applied to columns of pixels as well using a gradient associated with the y-axis.

Figure 5E:
Figure 5E:
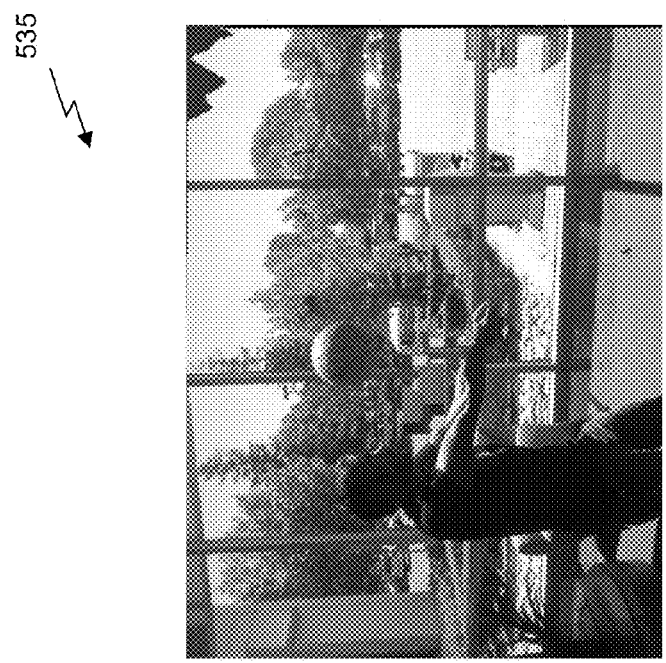

As shown in FIG. 5E, the FD block 540 may generate a pixel map 545 that indicates whether each pixel in the warped image 535 is reliable or unreliable. The pixel map 545 may be a two dimensional array of 1-bit values that indicate whether a pixel is reliable/unreliable. The pixel map 545 in FIG. 5E shows reliable pixels as black and unreliable pixels as white. In one embodiment, a subset of the scanlines in the warped image 535 is analyzed and the pixels in the scanlines that are not analyzed are marked as reliable/unreliable based on a corresponding pixel in an analyzed scanline. For example, only one scanline every n scanlines (e.g., 5 scanlines) is analyzed. Pixels in adjacent scanlines to the analyzed scanline are then marked as reliable or unreliable based on the corresponding pixel in the analyzed scanline (e.g., each pixel in a column of five adjacent scanlines is marked based on the single pixel in the column included in the analyzed scanline). This technique reduces the amount of computations that must be performed. It will be appreciated that unreliable pixels in one scanline are likely to be next to other unreliable pixels in an adjacent scanline. Such optimizations may reduce the number of computations performed without significantly reducing the accuracy of the pixel map 545.

Once the FD block 540 has determined which pixels are reliable or unreliable in the warped image 535, the WC block 550 corrects these pixels. In one embodiment, the WC block 550 is configured to implement a combination of dense flow estimation and a direct copy and paste from the reference image with blending. The dense flow estimation algorithm may be any dense flow estimation algorithm well-known in the art. For example, in one embodiment, the WC block 550 implements a patch match algorithm that attempts to match a patch of pixels in the reference image 410 to a corresponding patch of pixels in the source image 420.

More specifically, for each pixel in the warped image 535 marked as unreliable, the patch match algorithm attempts to match a patch of pixels in the reference image 410 corresponding to a location of the unreliable pixel in the warped image 535 to a patch of pixels in the source image 420. Once the matching patch of pixels in the source image 420 is located, the pixel at the center of the patch of pixels in the source image 420 is copied into the unreliable pixel in the warped image 535. The pixel in the warped image 535 may then be blended with the corresponding pixel in the reference image 410 to produce a corrected pixel in the warped image 535. The process may then be repeated for each of the unreliable pixels in the warped image 535 (i.e., for any pixels marked as unreliable in the pixel map 545).

In another embodiment, the WC block 550 may select pixels from the reference image 410 corresponding to locations for the unreliable pixels in the warped image 535 and adjust the intensity of the selected pixels to match an intensity of pixels in the source image 420 using an intensity mapping function. For example, the average intensity of pixels in the source image 420 may be 20% brighter than the average intensity of pixels in the reference image 410. In this case, the WC block 550 may copy a pixel from the reference image 410, increase the intensity of the pixel by 20%, and then blend that pixel with the unreliable pixel data in the warped image 535. It will be appreciated that the intensity mapping function may be a complex, non-linear, non-decreasing function. In one embodiment, the intensity mapping function may be estimated using a large number of pixel correspondences. In another embodiment, the intensity mapping function may be estimated via a histogram mapping technique.

Figure 5F:
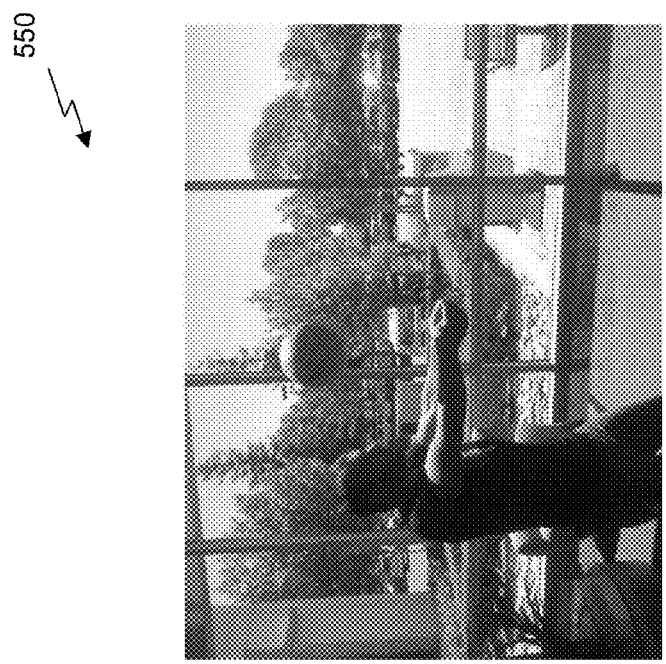
Figure 5F:
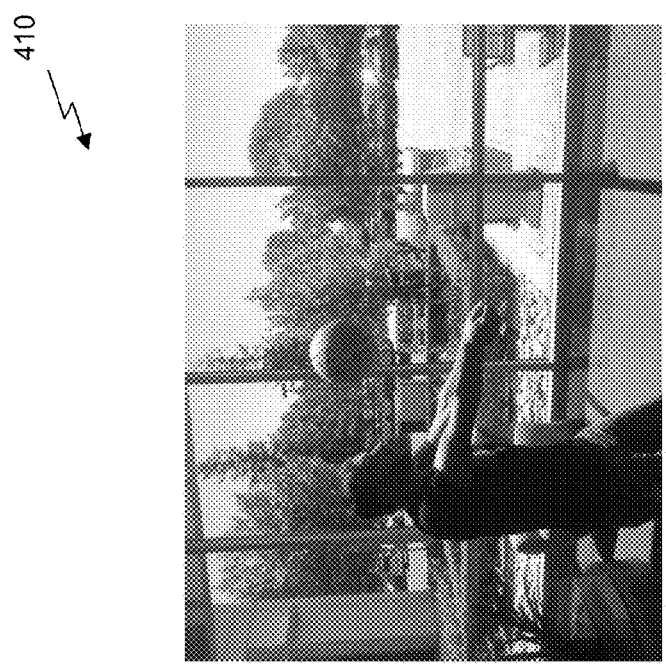

As shown in FIG. 5F, the WC block 550 generates a corrected warped image 550 by combining the reliable pixels with corrected pixels. The resulting corrected warped image 550 takes advantage of the lower computation complexity provided by sparse optical flow algorithms, propagates the sparse optical flow to each pixel in a similar manner to more complex dense optical flow solutions, and corrects for any errors in the resulting warped image. Such a technique may be orders of magnitude faster than applying a dense optical flow algorithm to the whole image, while not being prone to the inaccuracies and image artifacts associated with fast sparse optical flow algorithms that are applied to the whole image.

It will be appreciated that the FNRR algorithm 500 may be implemented by any type of processor coupled to a memory storing the reference image 410 and the source image 420. In one embodiment, the FNRR algorithm 500 may be implemented, at least in part, by the GPU 214 of the device 200. In other embodiments, the FNRR algorithm 500 may be implemented by the CPU 212 or the IPP 250 of the device 200. In addition, the images in the HDR image stack may be captured by the device 200 using the image sensor 280. In other embodiments, the images in the HDR image stack may be transmitted to a memory of the device 200, having been previously captured by another external device.

Figure 6:
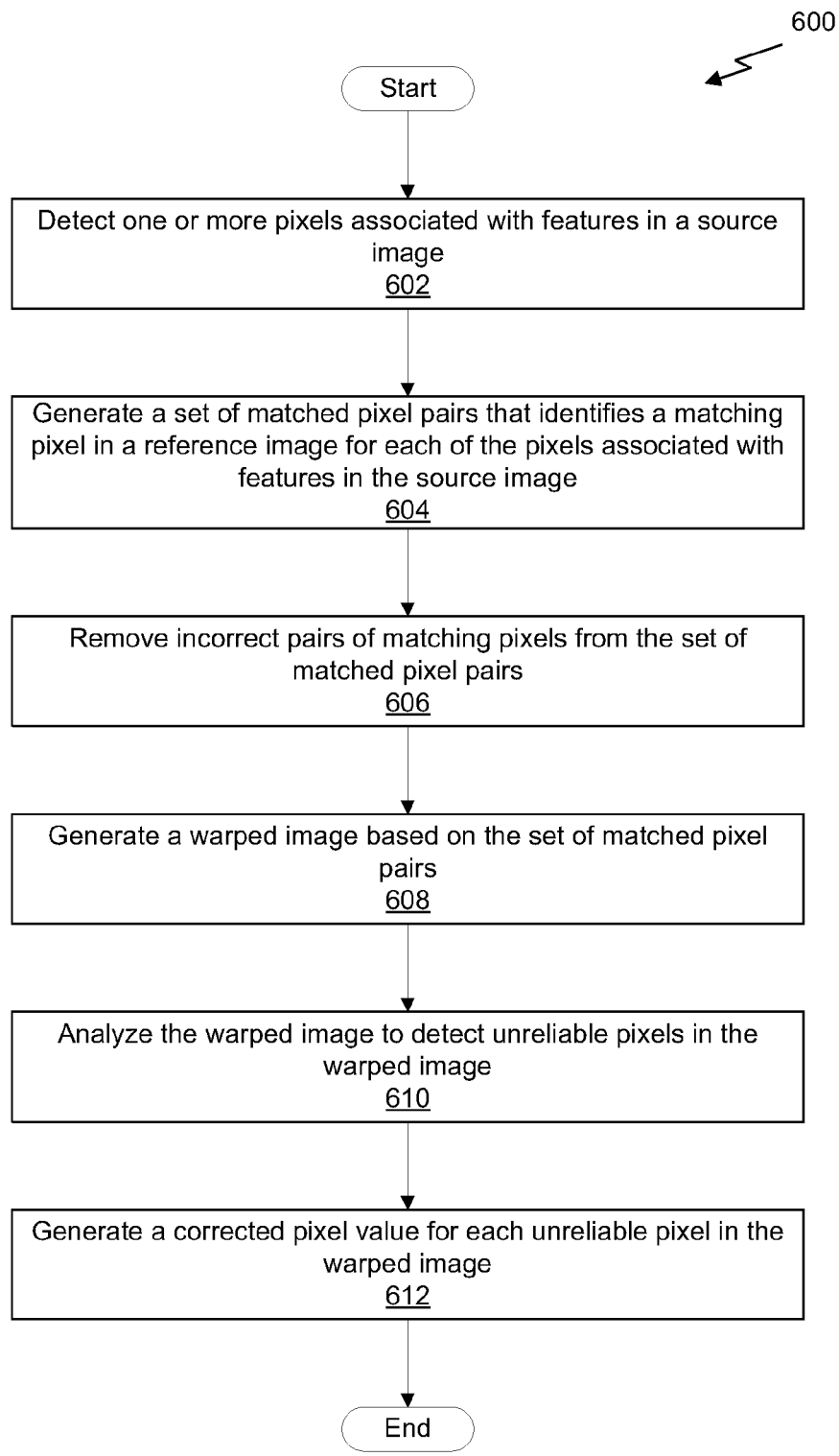
FIG. 6 illustrates a flow chart of a method for performing fast, non-rigid registration for HDR image stacks, in accordance with another embodiment.

FIG. 6 illustrates a flow chart of a method 600 for performing fast, non-rigid registration for HDR image stacks, in accordance with another embodiment. At step 602, the FMSOF block 510 is configured to detect one or more pixels associated with features in a source image 420. In one embodiment, the FMSOF block 510 detects pixels associated with features based on at least one gradient value for the pixel. At step 604, the FMSOF block 510 generates a set of corresponding pixels that identifies a matching pixel in a reference image for each of the one or more pixels associated with features in the source image 420. The set of corresponding pixels may be generated utilizing a Lucas-Kanade algorithm. At step 606, the IMD block 520 refines the set of corresponding pixels to remove incorrect matches. The set of corresponding pixels may be refined using a RANSAC algorithm that removes outliers in the set of corresponding pixels. At step 608, the SDOF block 530 generates a warped image 535 based on the refined set of corresponding pixels. The SDOF block 530 may propagate the estimated sparse flow field to a dense flow field in an edge-aware manner. The dense flow field is used to generate the warped image 535.

At step 610, the FD block 540 analyzes the warped image 535 to detect unreliable pixels in the warped image 535. In one embodiment, the FD block 540 is configured to select a scanline in the warped image 535 and calculate a gradient value for each pixel in the scanline. The FD block 540 then calculates a gradient value for each pixel in a corresponding scanline of the reference image 410. The position of peaks in the gradient values of the scanline in the warped image 535 and the corresponding scanline in the reference image 410 are compared to determine which pixels in the scanline of the warped image 535 are reliable or unreliable. The FD block 540 generates a pixel map 545 that represents the reliable and unreliable pixels. At step 612, a WC block 550 generates a corrected pixel value for each unreliable pixel in the warped image 535. In one embodiment, the WC block 550 implements a patch matching algorithm to select a pixel value from the source image 420 that is associated with the unreliable pixel in the warped image 535. Then, the WC block 550 blends the selected pixel value with a pixel value from the reference image 410 that is associated with the unreliable pixel in the warped image 535 to generate a corrected pixel value for the unreliable pixel in the warped image 535.

Figure 7:
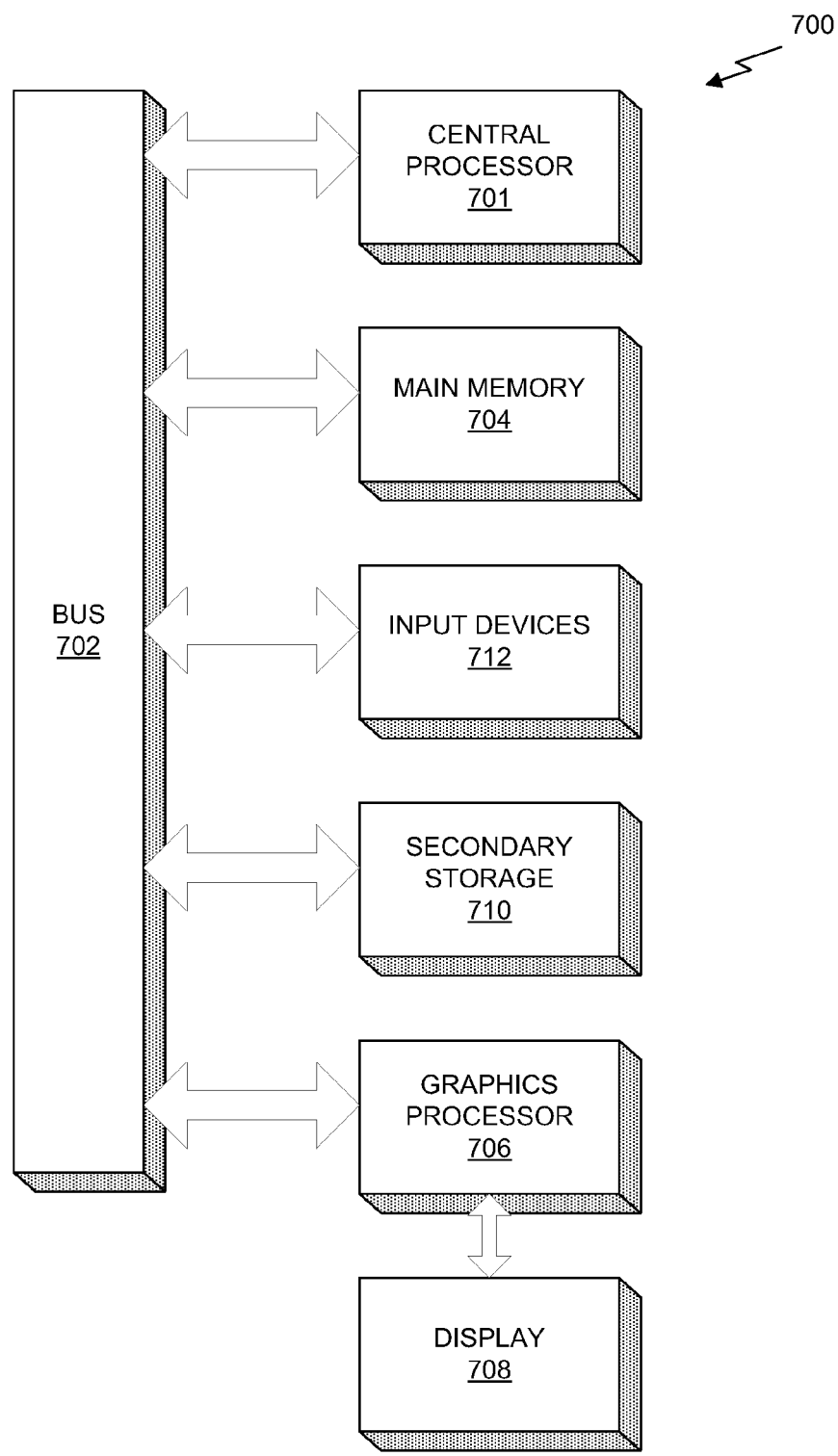
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 801 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   generating a warped image based on a set of corresponding pixels in a source image and a reference image;
   analyzing the warped image to detect a first subset of pixels in the warped image; and
   for each pixel in the first subset of pixels in the warped image, generating a corrected pixel value for the pixel,
   wherein analyzing the warped image to detect a first subset of pixels in the warped image comprises, for each scanline in a plurality of scanlines in the warped image:
   calculating gradient values corresponding to a plurality of pixels in the scanline,
   calculating gradient values corresponding to a plurality of pixels in a corresponding scanline in the reference image, and
   comparing the gradient values corresponding to the scanline in the warped image with the gradient values corresponding to the corresponding scanline in the reference image, and
   wherein the first subset of pixels includes pixels in the warped image identified as reliable based on a comparison of gradients associated with the pixels in the first subset of pixels to gradients associated with corresponding pixels in the reference image.

2. The method of claim 1, further comprising:
   identifying one or more pixels in the source image associated with features in the source image as feature pixels; and
   generating the set of corresponding pixels by matching the one or more feature pixels in the source image with one or more corresponding pixels in the reference image.

3. The method of claim 2, wherein feature pixels are identified by detecting pixels having gradients above a threshold value.

4. The method of claim 2, wherein the set of corresponding pixels is generated using a Lucas-Kanade algorithm.

5. The method of claim 2, further comprising refining the set of corresponding pixels based on a RANSAC algorithm.

6. The method of claim 5, wherein the RANSAC algorithm comprises:
   selecting a subset of corresponding pixels from the set of corresponding pixels;
   fitting an estimated homography matrix to the subset of corresponding pixels;
   identifying one or more pairs of reliable pixels from the set of corresponding pixels that fit the estimated homography matrix; and
   iterating the steps of selecting, fitting, and identifying a number of times.

7. The method of claim 1, wherein the plurality of scanlines in the warped image comprises a subset of every scanline in the warped image.

8. The method of claim 1, further comprising generating a pixel map that indicates whether each pixel in the warped image is reliable or unreliable based on the comparison of gradients associated with the pixels in the first subset of pixels to gradients associated with corresponding pixels in the reference image.

9. The method of claim 8, wherein the pixel map comprises a two-dimensional array of 1-bit values, each bit corresponding to a pixel in the warped image.

10. The method of claim 1, wherein generating the corrected pixel value for the pixel comprises:
    selecting a patch of pixels in the reference image based on a location of the pixel;
    matching the patch of pixels in the reference image to a corresponding patch of pixels in the source image; and
    blending a pixel value associated with the patch of pixels in the source image with a pixel value associated with the patch of pixels in the reference image to generate the corrected pixel value.

11. The method of claim 1, further comprising selecting the reference image and the source image from a high-dynamic range image stack.

12. The method of claim 11, wherein the reference image has an average intensity value that is less than or equal to an average intensity value of the source image.

13. A non-transitory computer-readable storage medium storing instructions that, when executed by a processor, cause the processor to perform steps comprising:
    generating a warped image based on a set of corresponding pixels in a source image and a reference image in a high dynamic range image stack;
    analyzing the warped image to detect a first subset of pixels in the warped image; and
    for each pixel in the first subset of pixels in the warped image, generating a corrected pixel value for the pixel,
    wherein analyzing the warped image to detect a first subset of pixels in the warped image comprises, for each scanline in a plurality of scanlines in the warped image:
    calculating gradient values corresponding to a plurality of pixels in the scanline,
    calculating gradient values corresponding to a plurality of pixels in a corresponding scanline in the reference image, and
    comparing the gradient values corresponding to the scanline in the warped image with the gradient values corresponding to the corresponding scanline in the reference image, and
    wherein the first subset of pixels includes pixels in the warped image identified as reliable based on a comparison of gradients associated with the pixels in the first subset of pixels to gradients associated with corresponding pixels in the reference image.

14. The non-transitory computer-readable storage medium of claim 13, the steps further comprising:
    identifying one or more pixels in the source image associated with features in the source image as feature pixels; and
    generating the set of corresponding pixels by matching the one or more feature pixels in the source image with one or more corresponding pixels in the reference image.

15. The non-transitory computer-readable storage medium of claim 14, wherein the set of corresponding pixels is generated using a Lucas-Kanade algorithm.

16. A system, comprising:
    a memory storing a reference image and a source image; and
    a processor configured to:
    generate a warped image based on a set of corresponding pixels in the source image and the reference image,
    analyze the warped image to detect a first subset of pixels in the warped image, and
    for each pixel in the first subset of pixels in the warped image, generate a corrected pixel value for the pixel,
    wherein analyzing the warped image to detect a first subset of pixels in the warped image comprises, for each scanline in a plurality of scanlines in the warped image:

calculating gradient values corresponding to a plurality of pixels in the scanline, calculating gradient values corresponding to a plurality of pixels in a corresponding scanline in the reference image, and comparing the gradient values corresponding to the scanline in the warped image with the gradient values corresponding to the corresponding scanline in the reference image, and wherein the first subset of pixels includes pixels in the warped image identified as reliable based on a comparison of gradients associated with the pixels in the first subset of pixels to gradients associated with corresponding pixels in the reference image.

17. The system of claim 16, the processor further configured to:

identify one or more pixels in the source image associated with features in the source image as feature pixels; and generate the set of corresponding pixels by matching the one or more feature pixels in the source image with one or more corresponding pixels in the reference image.

\* \* \* \* \*